May 19, 1953 — C. W. McKEE ET AL — 2,639,316
RAILROAD FISSURE DETECTOR CAR
Filed Jan. 24, 1949 — 2 Sheets-Sheet 1

INVENTORS.
Chester W. McKee
Richard W. McKee
BY

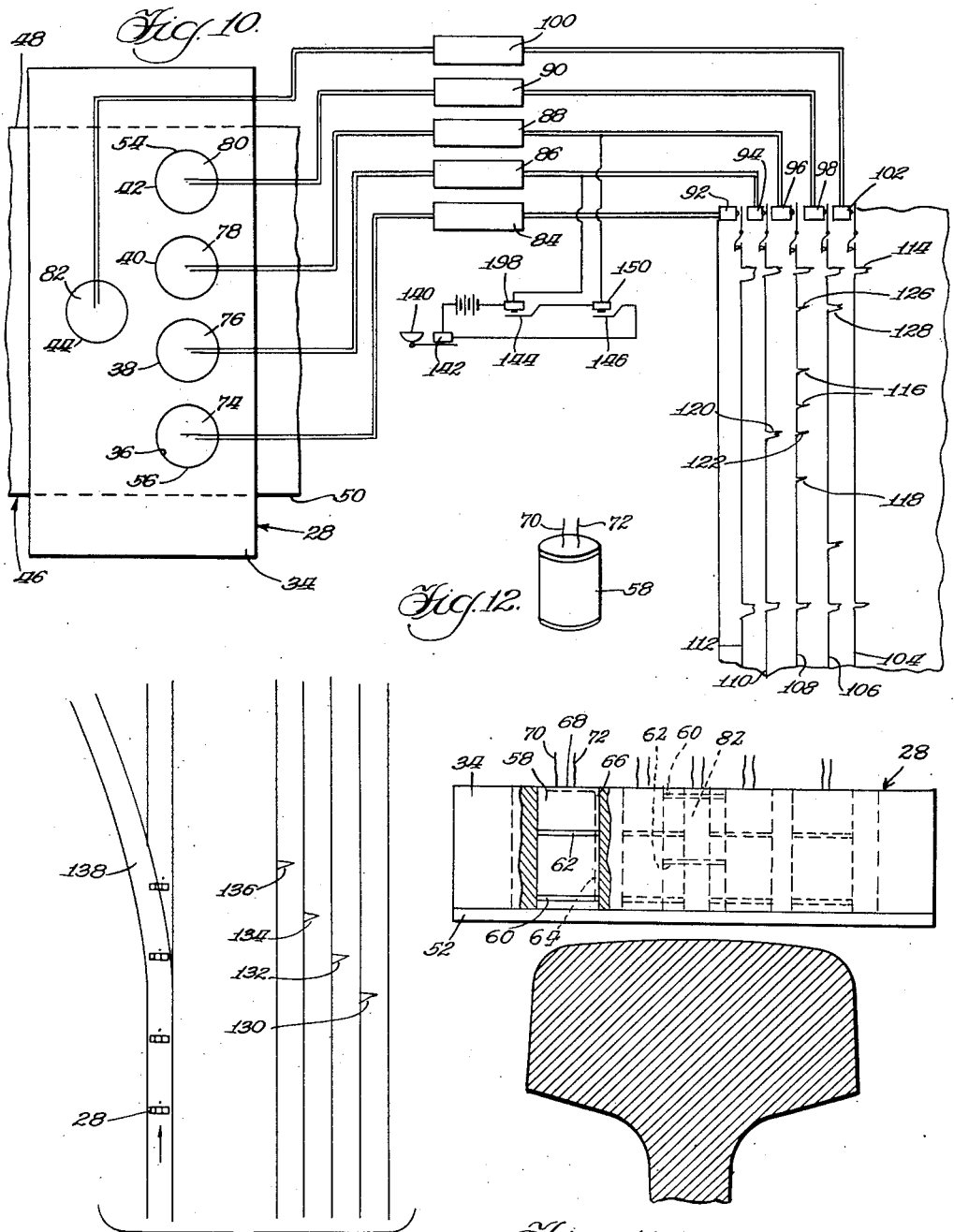

Patented May 19, 1953

2,639,316

UNITED STATES PATENT OFFICE 2,639,316

RAILROAD FISSURE DETECTOR CAR

Chester W. McKee and Richard W. McKee, Chicago, Ill., assignors to Teledetector, Inc., Chicago, Ill., a corporation of Delaware Application January 24, 1949, Serial No. 72,382

7 Claims. (Cl. 175—183)

This invention relates to a method and apparatus for detecting fissures in rail lying in track. This application is a continuation-in-part of United States copending applications, Serial No. 628,146, filed November 13, 1945; Serial No. 743,794, filed April 25, 1947, now Patent No. 2,594,332; and Serial No. 749,166, filed May 20, 1947, now Patent No. 2,602,840. This invention is part of the development disclosed in issued United States Letters Patent No. 2,388,683, dated November 13, 1945. Two other applications on rail fissure detection are being concurrently filed, Serial No. 72,383 and 72,384, and the first few paragraphs of this application are in part explanatory of the development during the past eighteen months.

As explained in the patent, applicants' method of fissure detecting turns upon utilizing a small pickup coil having a nonmagnetic core which in traversing a magnetic field does not distort the field, and consequently, produces potential signals faithfully reflecting changes in direction and density of flux in the field. As explained in Patent No. 2,388,683, the nonmagnetic core pickup coil traversing a true residual flux field produces a comparatively weak potential signal, thereby necessitating a high gain amplifier. As further explained in copending application, Serial No. 628,146, applicants discovered that there is a lateral sustained field on each side of the magnet which field is substantially stronger than a true residual magnetic field. Moreover, in testing a lateral sustained field, non-hazardous flaw signals derived from surface defects are weaker compared to hazardous fissure signals than are the non-hazardous flaw signals similarly compared when testing a residual field, that is, the comparative difference between hazardous and non-hazardous sustained field flaw signals is greater than the comparative difference between hazardous and non-hazardous residual field flaw signals. This greater comparative difference makes possible more effective discrimination between the two in sustained field testing. Applicants moved their nonmagnetic core coil pickup into this trailing sustained field and obtained stronger signals. This made it possible to lower the gain in the amplifier and thereby eliminate signals in their visual presentation means which were derived from tube characteristics in the amplifier.

Since the filing of these applications, applicants have been increasing the speed of operation of their equipment along the rail. When this was done with the equipment described in the earlier filed copending applications, it was observed that the amplitude of signals from internal fissures dropped and the amplitude of signals from harmless surface defects increased. The magnetometer indicated that the length of the trailing sustained field was about the same. The applicants concluded that as the speed of the car increased, the magnetizing force remaining constant, the tendency of the flux pushed out along the rail in the trailing sustained field by the trailing pole was less effective internally of the rail ball with the result that polarization of surface defects was more complete while polarization of the molecules deep in the rail ball where the fissures are, was less complete. One might summarize the object of the exploratory step in rail fissure detection work by saying that it seeks to produce strong potential signals from hazardous defects in the rail and weak or no potential signals from non-hazardous defects. It is the comparative strength of the signals initially produced in the pickup coil by the hazardous and the non-hazardous flux field which is important. As the speed of applicants' car was increased, therefore, this fundamental objective was increasingly defeated, and the applicants concluded that it was necessary to further increase the magnetizing force as the speed of the car increased.

The portable car shown in the copending applications weighs almost 1,000 pounds and further increasing its weight greatly impaired its portability. Moreover, a comparison of the operating costs of a portable fissure detector car operating at two to three miles an hour with the operating costs of a non-portable car operating at eight miles an hour showed that economy in operation favored the latter car. Hence, applicants built a non-portable car having magnets showing the same pole arrangement shown in copending application, Serial No. 749,166, but much heavier, and these magnets substantially polarized the entire rail ball at a speed of eight to ten miles an hour.

In order to understand the first object of this invention, and the discovery which is sought to be covered in this application, it must be borne in mind that applicants have used a non-magnetic core coil which extends over at least one side of a rail ball. Thus, in the Patent No. 2,388,683, in Fig. 41, there is shown a single coil having a vertical axis extending beyond both sides of the rail ball. In Figures 3 and 12 of copending application, Serial No. 628,146, there is shown a lead coil extending beyond both sides of the rail ball and two smaller coils each across respectively the gauge and field sides of the rail ball. All of these are nonmagnetic core coils and they do not distort the magnetic flux field through which they are moving. When applicants put the new car with heavy magnets on test, it was surprisingly successful. It was successful because it found fissures in that portion of the ball of the rail lying inside the joint bars at a track joint. For many years, detecting equipment has found fissures satisfactorily in the main body of the rail, that is, in that portion of the rail lying between about six inches outside each of the joint bars. Where the rails are thirty-nine feet long and four-bolt, twenty-four inch joint bar is used, approximately eighteen inches at each end of the rail has resisted accurate fissure detection, and where thirty-six inch joint bars are used, there is about twenty-four inches at each end of the rail in which satisfactory fissure detection has not been available. Applicants' nonmagnetic core coil has always had more success in detecting fissures in the joint bars than any magnetic core coil. Prior to applicants' building the heavy magnets, when applicants' nonmagnetic core coil pickup moved over the joint bars, it produced no potential signal unless there was a fissure or a flaw in the rail ball itself. With the development of much heavier magnets, and the nonmagnetic core coils shown in copending application, Serial No. 743,-794, the pen made a signal as the pickup crossed the ends of the two joint bars in a joint. Applicants were not surprised at this because it has always been known that joint bars and rail braces, particularly in switch layouts, have magnetic fields about them, and applicants were satisfied with the performance until they discovered that the signal from the ends of the joint bar were of sufficient amplitude when the car was moving at eight to ten miles an hour to substantially impair the ability of the pen unit to record a fissure between the end of the joint bar and the end of the rail. The pen unit is a very indelicate instrument. It writes the full length of a thirty-nine foot rail in two to three inches so that a signal from the end of the joint bar is spaced from the very strong signal derived from the rail joint itself by only one-eighth of an inch, with the result that from a visual standpoint, if the pen attempts to write between the signal from the end of the joint bar and the signal from the end of the rail, an operator is likely to be confused and unnecessary stops for hand checking are made. Applicants debated the advisability of supplementing their equipment with the cathode ray tube system disclosed in Patent No. 2,388,683, but rejected this because watching the tube is a very tedious task, necessitating at least one more operator.

The first object of this invention is to pick up fissure signals in rail ball lying between joint bars, braces, switch bars, switch heaters, oilers, or any other magnetizable reinforcements laterally protruding from the side of the rail, without picking up signals from these lateral reinforcements. More specifically, the first object of this invention is to devise a coil having a nonmagnetic core which will not generate a potential signal when threading the magnetic flux fields of joint bars and rail braces. This necessitated an analysis of the magnetic flux fields around joint bars, and in Figures 2 and 3, applicants illustrate the magnetic flux field around joint bars. The lengthwise configuration of the field as illustrated in Figure 2 is not clearly understood, but it is believed to be unimportant because once the pickup coil has passed over the end of the joint bars, it is apparently moving substantially parallel to the lines of flux, thereby cutting no flux variations and generating no voltage. A cross sectional configuration of these joint bar flux fields is better understood and is shown in Figure 3. The flux 10 from the joint bar 12 seems to extend above the rail to a point such as 14 and is measurable. The flux seems to extend inwardly of the top of the rail in measurable quantities along the dash-dot line 16. This is true on both sides of the rail ball in a joint bar, and it will be seen that there is a sort of tunnel or channel above the center of the rail in which the flux of the joint bar has no appreciable effect. It, therefore, occurred to the applicants that a pickup coil lying inside the vertical planes of the side of the ball, or better, lying inside the diagonal limits 16 and 18 of the joint bar flux fields, would not produce a signal from these fields. Applicants experimented with coils having magnetic cores and coils having nonmagnetic cores. In Figure 3, applicants used a coil having a vertical axis mounted on a nonmagnetic core and having an overall width of about two and one-half inches, the rail shown being a 131 pound rail whose head is three inches across. This pickup coil produced no potential signals derived from flux fields at the ends of flux bars in moving through a track joint. In Figure 4, applicants used a magnetic core coil having a transverse, horizontal axis and this produces signals for the ends of the joint bars. Applicants' explanation is that the iron core formed a shorter path for some of the flux from the ends of the joint bars and pulled the flux directly through it, thus destroying the channel or tunnel between the joint bar flux fields.

The second object of this invention is to adapt the channeling system of applicants' copending application, Serial No. 743,794, to a pickup in which all coils are lying inside the joint bar flux field limits 16 and 18. A feature of this invention is a four-coil pickup assembly, the coils being mounted in alignment transversely of the ball of the rail and each coil connected through a separate amplifier to its own pen unit. Each coil derives potential signals from its own individual longitudinal lane of flux above the rail ball.

Another object of this invention is to provide a more sensitive pickup coil. Applicants' earliest nonmagnetic core pickup having a vertical axis had the lower set of windings in a channel having a height of about one-fourth inch. This height, several years ago, was reduced to one-eighth of an inch and in the coils shown in copending application, Serial No. 743,794, the height is but one-sixteenth of an inch. Changing the height of the channels in which the windings lie was a result of using a lighter wire rather than a result of any theorizing on the matter. Some months ago, applicants mounted on the new, nonportable car, a plurality of the small spool coils hereinafter described with the lowermost coil lying in the slot having a height of one-eighth of an inch. With the high strength of the flux fields obtained by the more powerful magnets, these coils in a test at North Platte, Nebraska, generated a tremendous number of meaningless signals. The present amplifier has a modified form of suppressor on it, see the suppressor of Patent No. 2,388,683, and while the meaning of the signals could be wiped out by the suppressor, fissure signals were proportionately reduced and in the case of very small fissures, sometimes suppressed completely out. Applicants wound in the field some new small coils with a channel only ½ of an inch high. The test by these coils was surprisingly successful, and it occurred to the applicants that the upper windings on a coil having a vertical axis, by cutting flux at a slightly different angle than the lower windings of the same coil, may produce voltages which may cancel or amplify voltages produced by the lower windings, thus producing potential signals of no significance whatsoever. Thereupon, the applicants rewound the coils with a still finer gauge of wire, increasing the number of turns and these coils have been so successful that in comparative tests between the three systems of fissure detection made shortly before this writing, it is conceded that the Teledetector car illustrated in Figure 1, the only car which will pick up as low as five per cent to ten per cent fissures in the main body of the rail, and during the same testing pick up ten per cent and greater fissures inside the joint bars.

The following is a verbatim report of a test made by the Union Pacific Railroad whose employees operated applicants' car, and the first four lines of the second column indicate fissures in the ball inside joint bars:

| Miles Tested—750; Defects Found | | Location of Transverse Defects From End of Rail | | Size of Transverse Defects | |
|---|---|---|---|---|---|
| TD [1] | 84 | 0 to 6" | 3 | 0 to 5% | 1 |
| VSH [2] | 3 | 7 to 12" | 2 | 6 to 10% | 27 |
| HSH [3] | 21 | 13 to 18" | 6 | 11 to 15% | 21 |
| Miscl | 2 | 19 to 24" | 9 | 16 to 20% | 6 |
| | | 25 to 30" | 0 | 21 to 25% | 7 |
| Total | 110 | 31 to 36" | 0 | 26 to 30% | 2 |
| | | Over 36" | 64 | 31 to 35% | 2 |
| | | | | 36 to 40% | 2 |
| | | Total | 84 | 41 to 50% | 2 |
| | | | | Over 50% | 14 |
| | | | | Total | 84 |

[1] Transverse defect, i. e., dangerous transverse fissure.
[2] Vertical split head.
[3] Horizontal split head.

A further object of this invention is to locate the pickup coil at that point in the trailing sustained field where flux lines influenced by an internal fissure are most greatly distorted from the flux lines adjacent a normal rail ball. Assuming that the measurable trailing sustained field extended six feet behind the trailing pole of the magnet, there is an optimum point for the location of the pickup. Applicants cannot state the exact location. Experiments show that where the pickup is located less than eighteen inches from the trailing pole magnet, the potential signal produced by the pickup coil is of less amplitude than the potential signal produced by the same coil operated through the same fissure flux field at the same rate of speed and located three feet behind the trailing pole magnet. Experiments have also shown that when the pickup coil is located more than four and one-half feet behind the trailing pole of the magnet, a weaker potential signal is produced. A nonmagnetic core pickup coil located in the center half of the trailing sustained field seems to be at the most sensitive point for deriving internal fissure flux fields.

Applicants recognize that the assertion that the optimum point is at the midpoint of the trailing sustained field does not square with the theory that the volume of flux leaving the rail in the trailing sustained field should vary proportional to the distance from the trailing sustained pole. Moreover, their experiments do not show that positioning the pickup coil at the midpoint of the trailing sustained field is the optimum point. There seems to be a wide range commencing about one-fourth of the length of the trailing sustained field behind the trailing pole piece where the strongest potential signal is produced. Applicants are inclined to think that this results from the fact that the flux in the upper surface of the rail leaves the rail first and inasmuch as the internal fissures are usually deep within the ball, the flux whose direction is most affected by the fissure does not escape from the rail until the flux thereabove has left the rail. Theories on this were described in copending application, Serial No. 749,166.

These and such other objects as may hereinafter appear are attained in the embodiment of the invention disclosed in the accompanying drawings wherein:

Fig. 9 is a schematic illustration of applicants' improved pickup coil moving through a switch point together with a greatly lengthened section of tape illustrating the type of signal received from each of applicants' small coils as they move into the field between the switch point and the rail curving away from the main track, the curvature of this rail being exaggerated;

Fig. 10 is a plan view of applicants' pickup assembly together with a schematic illustration of the electrical connections between each coil and its pen unit. The figure also shows in full scale a portion of the tape as written by the pen unit;

Fig. 11 is a side elevational view, partly cut away of applicants' pickup assembly and small spool coil; and Fig. 12 is a perspective view of one of applicants' small spool coils.

Figure 1:
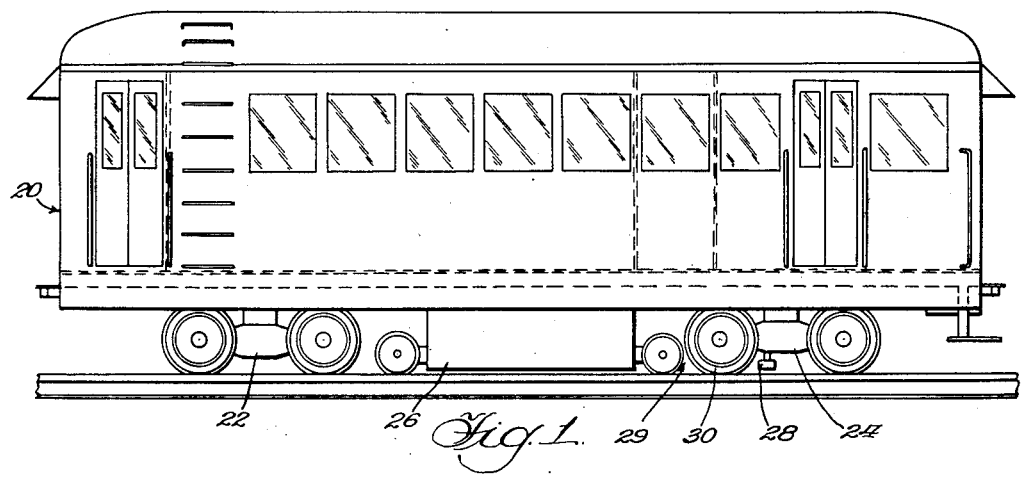
Fig. 1 is a perspective view of applicants' newest fissure detector car.
Figures 2, 3:
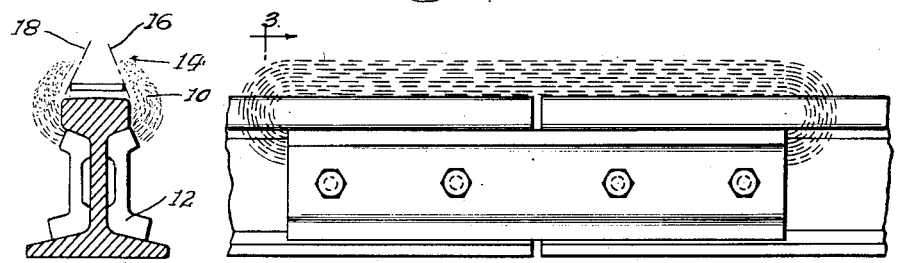
Fig. 2 is a side elevation of a track joint illustrating some of the lines of flux in the air around a joint bar.
Fig. 3 is a view in section of the flux field taken on the line 3—3 of Fig. 2.
Figure 4:
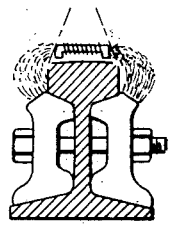
Fig. 4 is a view in section taken on the line 3—3 of Fig. 2 but showing how a pickup coil having an iron core distorts the fields of the joint bars.
Figure 5:
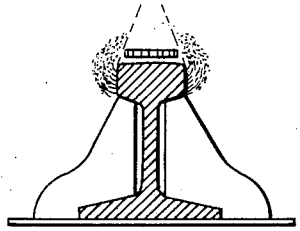
Figs. 5, 6, 7 and 8 are views partially in section showing other magnetizable reinforcements protruding laterally of a rail, namely, rail braces, a switch point and switch bar, an oiler, and a rail heater, respectively.

Continuing to refer to the drawings, in Fig. 1, the numeral 20 identifies a fissure detector car supported on trucks 22 and 24. A heavy magnet assembly 26 is suspended between the two wheels of each side and a pickup assembly 28 is positioned between the wheels of the truck 22. The wheel 30 is made of nonmagnetic material. The forward or cab end of the car is to the left and the operator's room is to the right. The engine room is located between the cab and the operator's room and the driving elements for the car and the generators for energizing the magnets and hand check electrodes need not be described. The pen and tape unit need not be described. Applicants have been using mechanical trains for synchronizing the pen unit with the forward speed of the car but shortly expect to utilize a pair of Selsyn motors, one drivingly connected to a wheel axle and the other to the pen unit, an arrangement somewhat similar to that employed in applicants' original car shown in Patent No. 2,388,683.

Referring to Fig. 10, applicants' pickup assembly 28 consists of a block 34 of nonmagnetic material having five through holes 36, 38, 40, 42 and 44 positioned as illustrated. This pickup assembly 28 is designed for a 131 pounds rail 46 which has a ball width of three inches. The gauge and field sides of the rail are indicated by the numerals 48 and 50 respectively. A plate 52 of nonmagnetic material is fastened over the bottom of the block 34, see Fig. 11. Returning to Fig. 10, the outside edge 54 of the hole 42 is spaced from the gauge side of the rail ball 48 by a distance of $\frac{1}{16}$ of an inch; and the outer edge 56 of the hole 36 is similarly spaced from the field side 50 of the rail ball. The four holes 36, 38, 40 and 42 are in alignment and equally spaced from each other. The hole 44 is centered over the rail ball. The pickup assembly is independently suspended from the car 20 in such a way that the center of the assembly, particularly the hole 44, is positioned directly over the center of the rail ball. This is done by a suspension rig which performs this function whether the car is moving on straight or curved track and which need not be shown and described as it forms no part of this invention.

Applicants' flux responsive means are coils wound on nonmagnetic cores. Applicants call them spool coils and they are all identical in the number of windings, the size of the wire used, the diameter of the coil core itself, and the outside diameter of the coil. One coil for generating signals from the joint, however, is inversely mounted with respect to the other four.

Examining now one of these coils, referring to Fig. 11, the numeral 58 identifies a block of nonmagnetic material in the circumferential surface of one end of which is cut an annular channel 60. The lower edge of this channel is spaced from the plate 52 by $\frac{1}{16}$ of an inch and the channel width or height is $\frac{3}{32}$ of an inch. Spaced from the upper side of this channel by one-half inch is a like sized channel 62. Channels 64, 66, and 68 having a depth of about $\frac{3}{32}$ of an inch are cut in the cylindrical surface and one end of the spool block 58 so as to form passageways connecting the two channels 60 and 62 to each other and to one end of the spool.

A large number of turns of fine insulated wire are wound in the channel 60 and their lead ends are carried up the channel 64 where a similar number of turns but in the opposite direction, are wound in the channel 62. The windings in the channels 60 and 62 are series connected and the two lead conductors are carried up to the end of the spool and out where they are given the designations 70 and 72.

Four spool coils 74, 76, 78 and 80 are dropped into the holes 36, 38, 40 and 42 of the pickup block 34, see Fig. 10, with the channel 60 down. In this position, the coil in the channel 60 constitutes the fissure flux responsive means. This coil generates the potential signals from the fissure flux fields. The opposed winding in the channel 62 serves to cancel out non-significant potential signals generated by large fields emanating from equipment on the car, although in the very strong abnormal fields in the rail ball, this upper coil may serve to partially cancel the signal derived by the lower coil.

The pickup assembly 28 is positioned ideally at a height above the rail of about $\frac{1}{8}$ inch, as illustrated in Fig. 11.

A rail joint spool coil 82 is identical with the other coils but is inversely mounted in the hole 44, as illustrated in Fig. 11, so that the coil in the channel 60 is close to the top of the pickup assembly 28 and the coil in the channel 62 is spaced from the top of the rail by almost $\frac{3}{4}$ of an inch. The coil in the channel 62 acts as the potential signal producing element and it is spaced at a much greater distance above the rail joint. Because the intensity of the flux field varies proportionately, inversely with the distance of the pickup coil from the rail, the signal produced in the coil in the channel 62 of the rail joint spool 82 will have much less amplitude than the signal produced in the rail joints in the other four spool coils with the result that the rail joint signal will be of shorter duration and more precise, which is desirable.

The spool coils 74, 76, 78 and 80 are each channeled through their own amplifiers 84, 86, 88 and 90, and the output of these amplifiers is respectively delivered to pen unit assemblies 92, 94, 96 and 98. These amplifiers and pen units need not be described. The rail joint spool core 82 is separately channeled to amplifier 100 and the output of this amplifier leads to pen unit 102.

Referring now to that portion of Fig. 10 illustrating a portion of tape produced by applicants' pickup assembly, the numeral 104 identifies the rail joint signal path, 106 the gauge signal path, 108 the gauge center signal path, 110 the field center signal path, and 112 the field signal path. It will be observed that the rail joint signal 114 is of shorter duration than the rail joint signals produced by the other four spool coils. Note also that each coil may produce a signal without any of the other coils receiving any signal. Note signals 116 and 118. The importance of applicants' small coils closely spaced can be appreciated by understanding the significance of these signals 116 and 118. Their significance is that they have no significance. A study of the rail at the points where the flux fields produced these signals 116 and 118 will disclose no fissure. Instead, the rail at these points will disclose some slight aberration which is of no significance from the standpoint of a dangerous fissure. This boils down to saying that applicants' multiple coil pickup is discriminatory between significant potential signals and non-significant potential signals in that two signals transversely aligned on the tape such as 120 and 122 must occur to justify stopping the car to perform the time-consuming hand check. The only signals shown on the tape in Fig. 10 that justify stopping the car to perform a hand check are signals 120 and 122. Applicants do not discount the fact that one spool coil might produce a signal 116 as a result of passing through a very small fissure flux field, but applicants' apparatus picks up fissures as small as five per cent of the ball head and when such fissures have been found in the past, they have invariably appeared in two adjacent pen unit signals.

The signals 126 and 128 would justify a stop if unexplained. Along the gauge and field sides of a rail are to be found frequently shells, flaws and spalled-out spots which are harmless, and the operator watches for these. It happens that they lie almost universally close to the gauge and field edges, and consequently, by having four aligned coils, the failure of either the gauge center or the field center coils to record a signal is almost conclusive evidence that signals produced by the gauge or field coils alone are not derived from dangerous flaws. Where one of the center pens records a signal simultaneously with a field or gauge pen, if the operator cannot see from his seat in the car a shell or flow or burn or spalled-out spot, he will stop the car for a hand check.

Figure 6:
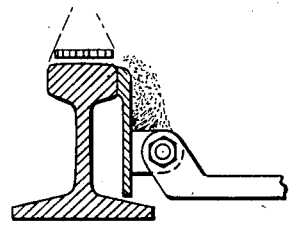

It is seen, therefore, that it is the transverse alignment of the small coils in applicants' pickup assembly which provides a method of discriminating between harmless flaws and dangerous fissures during the exploratory step. This is solely the result of the transverse alignment of the coils and of the pens. One could obtain much the same result by staggering the coils along the rail and then by correspondingly staggering the pens of the tape. A tape of like significance and equally readable would result. But this arrangement of coils is not to be confused with the theory of any staggered arrangement of coils such as that shown in Fig. 6 of copending application, Serial No. 743,749. Theoretically, the staggered coils in this application produce three successive signals from a transverse fissure and produce on the tape three successive signals—successive in point of time. However, visibly, the three signals would be simultaneous because the spacing of the coils longitudinally of the rail from each other is only a matter of three or four inches, and the spacing of signals on the tape derived from this length of rail would not be perceptible.

Applicants' method of distinguishing various types of flux from each other during the exploratory step turns upon producing a plurality of signals simultaneously from the same transverse portion of a rail, in conjunction with the operator's watching the rail. The narrowness of the coils as measured transversely of the rail is important. The flux fields of the rail are divided into four longitudinal channels, each of which channels is traversed by one flux responsive means, connected to its own amplifier and its own pen unit, the pen units being so related that they will show simultaneously produced signals.

Returning now to Fig. 1, the pickup coil 28 is located about four feet behind the trailing pole of the magnet 26. In the trailing sustained field generated by these magnets, this position is slightly more than half of the length of the trailing sustained field generated by the magnets when the car is moving at eight or nine miles an hour. By increasing the capacity of the magnets a drop in the length of the trailing sustained field due to increasing the speed of the car, can be compensated for. When a 131 pound rail is saturated, applicants find that the length of the trailing sustained field is approximately six or seven feet. Undoubtedly, there is some magnetism in the rail further back from the trailing pole, but it is not perceptible, it has become truly residual magnetism. The pickup coil should be positioned some place in the central half of the trailing sustained field. Its exact position will depend upon other elements of the car. A pickup coil positioned at point 29 is too close to the trailing sustained field and is not believed to be traversing lines of flux from deep inside the rail which are greatly affected by an internal fissure.

Figure 9 illustrates the type of signal that may be received by applicants' apparatus moving through a switch point. The purpose is to show that applicants' apparatus can detect fissures in switch points. The signals 130, 132, 134 and 136 are the maximum signals produced by applicants' coils. As each coil passes over the joint between the switch point and the rail, it may produce a signal as shown. Ordinarily, no signal is produced because a pickup coil moving longitudinally of the rail does not produce a signal for a longitudinal separation, even for a joint such as that between a rail and a switch point. The only time that a vertical or horizontal split head produces a signal is when it has a transverse component and fortunately a fissure that stems from a longitudinal split develops a transverse component while it is still very small. The separation between the rail and the switch point illustrated in Fig. 9 would probably produce the signals shown on the tape because the separation has a definite transverse component. In actual switches, however, the curvature of the rail 138 is not nearly so sharp, the lateral deviation being a fraction of an inch per linear foot, with the result that applicants' pickup coil moving through a switch point in which neither the rail nor the switch point contains any internal fissures will produce no signals at all. It follows that applicants' coils will readily write fissures in the switches.

Figure 8:
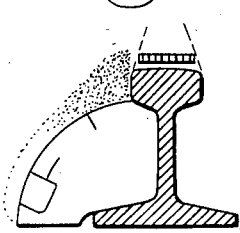

In the switches, applicants' improvement of the four transversely aligned coils all lying $\frac{1}{16}$ of an inch inside the edges of the rail ball is very valuable because the switch points are connected by cross arms and the cross arms are fastened to the switch points by protruding steel flanges. All of these laterally protruding elements generate flux fields, but being substantially lower than the top of the rail ball, the tunnel or channel of flux above the central part of the ball and close to its surface, which flux is substantially unaffected by the flux fields of these laterally protruding elements, remains. In most switches, the rails such as 138 are supported by rail braces. Then too, as illustrated in Fig. 8, there is frequently positioned adjacent the side of the rail web opposite the switch point, a heater, which also sets up its own magnetic flux field.

Applicants' pickup coil successfully detects fissures in a rail ball which is surrounded by all of this equipment. At the present time the only portion of a rail that remains untested is the frogs of switches and crossovers. The only place where applicants raise their pickup coil, at the present time, so as to discontinue flaw detection work as the car moves along the rail, is at these frogs. There is one frog on one rail in each switch and, of course, four frogs at each crossover.

Figure 7:
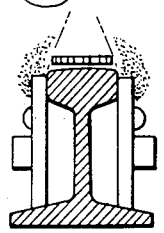

The cross section shown in Fig. 7 is schematic. An oiler is a bar lying along one side of a rail ball which can be raised and lowered and in so doing smears the flange side of the rail ball with oil. The oilers protrude from the side of the rail by a distance slightly greater than that of the joint bars.

Referring to Fig. 10, the numeral 140 identifies a bell which is sounded by the closing of a relay 142 in a bell circuit containing the armatures 144 and 146 of a pair of relays 148 and 150. The relays 148 and 150 are respectively connected to the circuit from the field center coil 76 and the circuit of the gauge center coil 78. When a potential signal is received by both of these circuits at the same moment, both armatures 144 and 146 are closed, thereby ringing the bell. This bell system is to assist the operator. All signals including those from very small fissures ordinarily produce potential signals in both of the center coils, and it is important that an operator never overlook two laterally aligned signals on the two center lines on the tape. Also the bell will serve as a check on any deficiencies of the two center line pens. It is true, however, that a skilled operator does not need this bell arrangement. Each pen unit clicks when functioned. When a joint is crossed, five pen units click simultaneously. When traversing the main body of the rail only rarely does more than one pen unit click at the same moment. A skilled operator can tell by the sound whether one or two pen units click.

Having thus described our invention, what we claim is:

1. Rail car fissure detection apparatus comprising a car supported by track wheels, a plurality of pickup coils each wound on a vertically disposed nonmagnetic core and suspended above the rail ball, said pickup coils being non-overlapping longitudinally and transversely over the rail ball so that each will examine exclusively a longitudinal path of flux fields above the ball, and a separate amplifier connected to a separate visible signal producing means with the input of each amplifier connected to each pickup coil.

2. Rail car fissure detection apparatus comprising a car supported by track wheels, a plurality of pickup coils each wound around a vertically disposed nonmagnetic core and suspended over the rail ball, said coils being non-overlapping longitudinally and transversely and aligned transversely over the rail ball with all coils lying inside vertical planes containing the side walls of the rail ball, a separate amplifier connected to each coil, and a pen unit connected to each amplifier, said pen units being in transverse alignment over a common movable tape.

3. Rail car fissure detection apparatus comprising a car supported by track wheels, four pickup coils suspended over the rail ball, each coil being wound around a vertically disposed nonmagnetic core and each having an outside diameter of approximately one-half inch with a height of approximately one-thirty-second of an inch, said coils being non-overlapping longitudinally and transversely and aligned transversely over the rail ball with all coils lying inside vertical planes containing the side walls of the rail ball, a separate amplifier connected to each coil, and a pen unit connected to each amplifier, said pen units being in transverse alignment over a common movable tape.

4. A method of detecting internal fissures in rail ball lying in track which comprises the steps of progressively energizing the rail ball to form flux fields thereabout, of moving simultaneously a plurality of small, independent pickup coils in side-by-side transverse relationship to the rail through the flux fields above the rail, of moving a like plurality of small, independent pickup coils each in bucking-out relationship in the circuit of one of the associated coils and in side-by-side relationship at a point immediately above the first set of coils, and of presenting simultaneously and independently potential signals generated by each pair of coils in sensibly apprehensible form.

5. Rail car fissure detection apparatus comprising a car supported by track wheels, means for longitudinally magnetizing a rail suspended from the car, a plurality of small pickup coils suspended from the car, said coils being non-overlapping longitudinally and transversely aligned over the rail ball so that each will examine exclusively a longitudinal path of residual flux fields above the ball, and a separate amplifier connected to a separate visible signal-producing means with the input of each amplifier connected to each pickup coil.

6. The apparatus of claim 5 wherein the visible signal-producing means consists of separate pens each associated with one amplifier and all writing on a single moving tape.

7. In rail flaw detecting apparatus, the combination of means for progressively energizing a rail to establish characteristic magnetic conditions in the vicinity of flaws, and other characteristic magnetic conditions in the vicinity of surface defects, a detector unit comprising at least three detectors for inductively locating said conditions, a plurality of amplifiers, one associated with each detector and recording means including a moving tape and a plurality of recording pens, one associated with each amplifier and detector, for making parallel line records on the tape in response to the detectors, said detectors being spaced apart in lateral alignment, and each including a coil in close magnetic coupling with a specified longitudinal portion of the top of the rail head, said detectors being of such size and inductive strength, and so arranged that there is substantially no overlapping between adjacent longitudinal portions of the top of the rail head magnetically searched by said laterally spaced coils, the width of each detector being less than one-fourth of the width of the rail head.

CHESTER W. McKEE.
RICHARD W. McKEE.

References Cited in the file of this patent

UNITED STATES PATENTS

| Number | Name | Date |
| --- | --- | --- |
| 2,109,455 | Barnes et al. | Mar. 1, 1938 |
| 2,276,011 | Billstein | Mar. 10, 1942 |
| 2,297,379 | Drake | Oct. 6, 1942 |
| 2,388,683 | Frickey et al. | Nov. 13, 1945 |
| 2,461,253 | Barnes et al. | Feb. 8, 1949 |
| 2,507,683 | Mesh | May 16, 1950 |